United States Patent [19]

Deman et al.

[11] Patent Number: 4,554,669

[45] Date of Patent: Nov. 19, 1985

[54] FREQUENCY JUMP RADIOCOMMUNICATIONS SYSTEM WITH INTERBURST REDUNDANCY

[75] Inventors: Pierre Deman; Henri Butin, both of Paris, France

[73] Assignee: Thomson CSF, Paris, France

[21] Appl. No.: 503,598

[22] Filed: Jun. 13, 1983

[30] Foreign Application Priority Data

Jun. 18, 1982 [FR] France ............................... 82 10709

[51] Int. Cl.[4] .......................... H04B 7/12; H04L 1/08
[52] U.S. Cl. .......................................... 375/1; 370/94
[58] Field of Search ....................... 375/1; 370/109, 89, 370/94; 371/69

[56] References Cited

U.S. PATENT DOCUMENTS 3,781,795 12/1973 Zegers ..................................... 371/8
4,066,964 1/1978 Costanza et al. ..................... 375/38

FOREIGN PATENT DOCUMENTS 2052217 1/1981 United Kingdom .

Primary Examiner—Robert L. Griffin
Assistant Examiner—Timothy K. Greer
Attorney, Agent, or Firm—Cushman, Darby & Cushman

[57] ABSTRACT

A radiocommunications system for transmitting packets of digitized data between a central station and a plurality of subscriber stations using a common set of frequencies. Each subscriber station and central station has an input circuit for compressing packets of digitized data, and a transmitter for generating a transmitter carrier wave. The carrier wave frequency of the transmitter is varied by steps with predetermined frequency values according to a frequency law assigned to the subscriber station and independent of the laws assigned to the other subscriber stations. The frequency steps are synchronous with the frequency steps of the other subscriber stations and the steps have the same duration. A processing circuit coupled between the input circuit and the transmitter calculates and inserts redundancy data into the succession of digitized data. A reception circuit is also provided in each subscriber station and central station with a demodulator for demodulating digitized and redundancy data received by the subscriber station; a memory circuit coupled to the output of the demodulator for storing the demodulated data; and an output circuit, coupled to the output of the memory circuit though a circuit for validating and transferring the demodulated data. A comparator controls the output circuit by comparison of the digitized data and the corresponding redundancy data.

4 Claims, 5 Drawing Figures

FREQUENCY JUMP RADIOCOMMUNICATIONS SYSTEM WITH INTERBURST REDUNDANCY

BACKGROUND OF THE INVENTION

1. Field of the Invention

The invention relates to radiocommunications systems providing the link between subscribers, possibly mobile, and one or more fixed central stations over frequency jump channels and more particularly to a system of this type in which the information is transmitted in a redundant way over the successive steps of the frequency jump law characterizing the link.

2. Description of the Prior Art

In a system where the links are provided over frequency jump channels, a frequency jump law may be assigned to each mobile unit. The laws of the different mobile units of the same space-time-frequency continuum are independent but change values simultaneously and the values of the frequencies are chosen from the same predetermined set of frequencies. Transmission takes place over frequency bursts separated from each other by dead times which facilitate the frequency changes.

In such a system, there exists intrinsic interference resulting from the simultaneous transmission on the same frequency by two transmitters of the network, when the frequency jump laws corresponding to these two links overlap on a given burst; the associated receiver may then detect, if no additional precautions are taken and if the level of the interference is greater than the level of the communication in progress, data transmitted by a transmitter which is not associated therewith.

It is therefore necessary in such a system to provide means ensuring continuity of transmission so that the data detected correspond to the same communication, the data received which do not correspond to the communication in progress being suppressed.

This suppression must be made by whole bursts since the intrinsic interference extends over whole bursts, all the bursts being transmitted in synchronism in the system.

SUMMARY OF THE INVENTION

The invention provides a radiocommunications system in which a particular redundancy is introduced to reduce the sensitivity to intrinsic interference and to ensure simultaneously the continuity of the transmission during a communication.

In accordance with the invention a frequency jump radiocommunications system in which a link between a subscriber station and a fixed station is effected in a frequency jump channel according to a law associated with the subscriber station varying by jumps to successive bursts of a predetermined duration, the frequency laws associated with the different subscriber stations being independent but using a common set of frequencies, the transmission bursts being synchronous for the whole of the system and the information to be transmitted being digitized, is characterized in that the transmission part of any station comprises an input circuit for compressing packets of digitized data, a processing circuit for calculating and inserting redundancy data into the succession of digital data so that this redundancy data and the digital data having served as the basis for calculation thereof are transmitted on different bursts, and in that the reception part of a station comprises a memory circuit coupled to the output of the demodulator, a circuit for validating and transferring demodulated packets of data and an output circuit both coupled to the memory circuit, the validation and the transfer being controlled by comparison of the digital data and of the corresponding redundancy data.

BRIEF DESCRIPTION OF THE DRAWINGS

The invention will be better understood and other features will become clear from the following description with reference to the accompanying drawings.

DESCRIPTION OF THE PREFERRED EMBODIMENT

In a radiocommunications system of the above described type, the messages to be transmitted are in the form of digital data grouped in packets formed by a sequence of bursts variable in number; each burst corresponds to a brief transmission on a given frequency carrier, modulated by the bits of information to be transmitted. Between the bursts, dead times are provided for facilitating the positioning of the synthetizer for changing the carrier frequencies of the bursts.

During a transmission, the first burst of a sequence may be coded in a particular way to identify a sequence beginning. Subsequently, during the transmission, it is necessary to be able to recognize whether the following bursts belong to the sequence or not. According to the invention, during transmission, the useful data is transmitted with a redundancy which distributes the information over several successive bursts, causing an increase of the useful flow proportional to the redundancy introduced.

During reception, demodulation is effected by using the signals received over the whole of the bursts on which the information is carried, while comparing the results of demodulation obtained for the different possible combinations of burst, a burst being determined as belonging to the sequence when the results of the different comparisons have allowed it to be validated.

Figure 1:
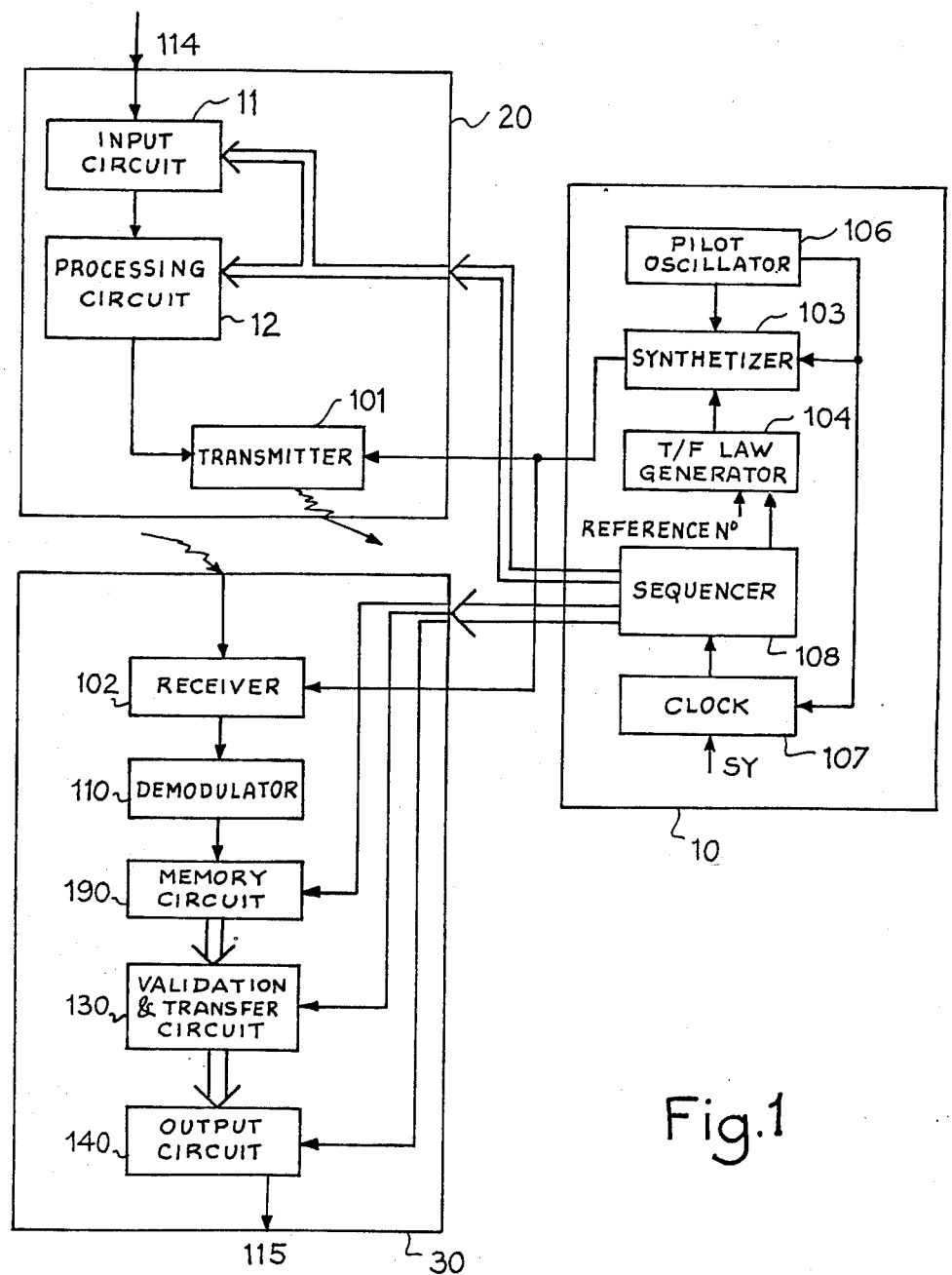
FIG. 1 is a block diagram of a transmission-reception unit for a station of the radiocommunications system in accordance with the invention.

FIG. 1 is a block diagram of a transmission-reception assembly for a fixed or mobile station of the system. It comprises a transmission part 20, a reception part 30 and an assembly of common transmission-reception circuits 10.

The common transmission-reception circuits 10 of the station comprise a frequency jump law generator, T/F law, 104, controlled by an output of a sequencer circuit 108. The frequency jump law generated by generator 104 is determined from the reference number of a mobile subscriber. For a mobile station, this reference number is proper to the station and fixed. For a fixed station this reference number is variable and equal to the number of the mobile unit called, a particular frequency jump law being assigned to each mobile unit and followed by the fixed station establishing the link. The output of this time-frequency law generator is connected to a control input of a frequency synthetizer 103 further receiving the basic frequency from a pilot oscillator 106. This oscillator 106 also controls a clock 107 having a timing control input SY. In one embodiment of the radiocommunications system of the invention, the timing of clock 107 of the station is provided by an external control for fixed stations and from the data received for the mobile stations. The output of this clock 107 is connected to the input of the sequencer circuit 108.

The output of synthetizer 103 delivers then for each step of the time-frequency law in progress a different carrier frequency characteristic of the mobile unit and of the time of the network.

The transmission part 20 comprises an input 114 for the signal to be transmitted, an input circuit 11 whose output supplies the signal to be transmitted in digital form and a series processing circuit 12, both controlled by the sequencer circuit 108 of the assembly of common transmission-reception circuits. The processing circuit 12 is such that digital redundancy data, determined from the digital data to be transmitted over the successive bursts, is inserted into the succession of digital data to be transmitted. For that, the succession of data is compressed in a ratio dependent on the duration of the interburst dead time and on the redundancy rate introduced. The digital redundancy data are inserted into the succession of data to be transmitted so that, during transmission of the successive bursts, this redundancy data and the digital data having served as basis for calculating this redundancy data are transmitted on different bursts. The digital redundancy data may be the digital data to be transmitted itself, as described in detail hereafter in a first embodiment of the system, a logic combination of several groups of data, or redundancy binary elements calculated from the data to be transmitted by a code for detecting and correcting errors, for example a Reed Solomon code. The output of the processing circuit is connected to the input of the transmitter 101 which further receives from the synthetizer 103 the carrier frequencies for the successive transmission bursts.

The reception part 30 comprises a receiver 102 which receives the modulated signals and is controlled by the frequency synthetizer 103. The output of receiver 102 is connected to the input of demodulator 110 which supplies the succession of demodulated digital data. This data is transmitted to a memory circuit 190 having a control input connected to the output of the sequencer 108, whose capacity is sufficient for the redundancy data and digital data having served as basis for calculating this redundancy data to be present simultaneously in the memory circuit. The outputs of this memory circuit are connected to the inputs of a logic validation and transfer control circuit 130. This circuit processes the data received and authorizes the transfer of a group of data transmitted on a burst when the comparison of this data with the corresponding redundancy digital data transmitted on another burst results in the validation of this group of data. The data are then transferred to an output circuit 140 which restores them to their normal timing.

Figure 2:
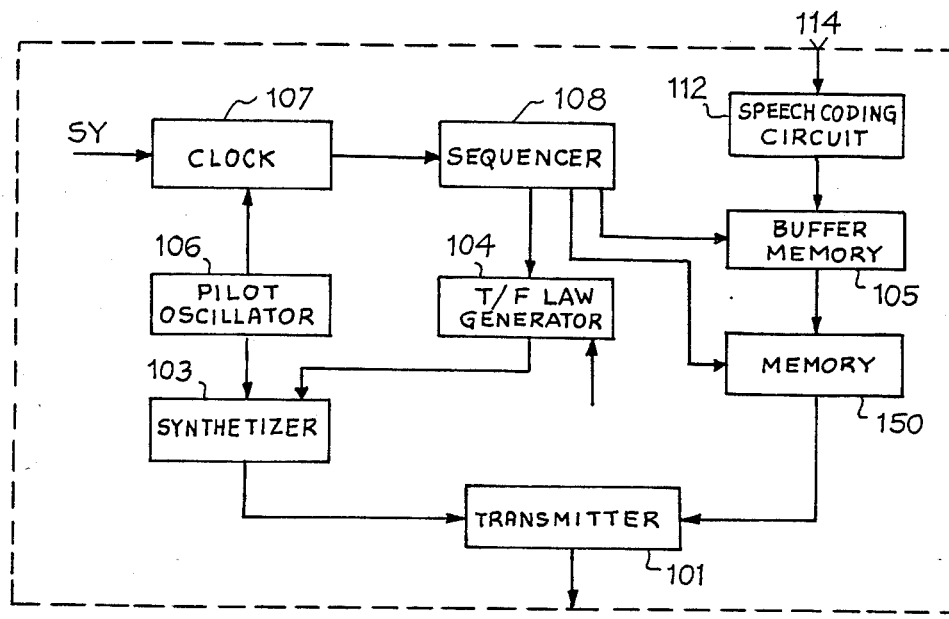
FIG. 2 shows one embodiment of the transmission part of a station of the radiocommunications system for a first operating mode.

FIG. 2 shows in greater detail a first embodiment of the transmission part, with the common circuits, of a station in accordance with the invention, this station being either a fixed station or a mobile station. For transmitting a speech signal, the input 114 of this transmission circuit receives an analog signal. The input circuit is a speech coding circuit 112 which delivers the speech signal in coded digital form. The processing circuit 12 (FIG. 1) comprises a buffer memory 105, the readout of the samples stored in this circuit being controlled by the sequencer circuit 108. In the case of transmission of digital data, they are directly usable in the buffer memory 105. The output of this buffer memory is connected to the input of a second memory 150 whose output supplies the data to the input of transmitter 101. This memory 150 is controlled by the sequencer 108 and the data delivered at its output is formed of packets of data compressed at the output of memory 105, repeated over two successive bursts in this first operating mode.

Figure 3:
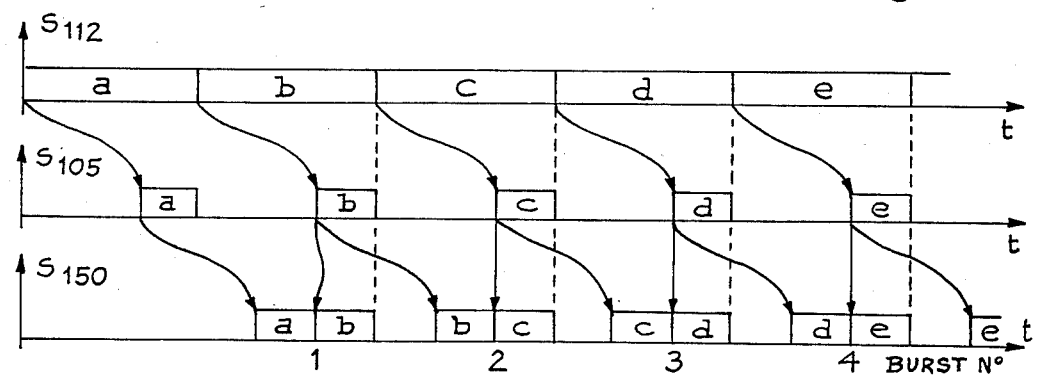
FIG. 3 is a signal diagram illustrating this first operating mode of the system of the invention.

FIG. 3 illustrates this first interburst redundancy mode. The control of transfer from the buffer memory 105 into memory 150 and the readout of data from memory 150 are controlled by the sequencer circuit 108 according to the timing diagram shown in FIG. 3. In this figure, signal $S_{112}$ is the output signal from the speech coding circuit, the data having been fictitiously separated into packets a,b,c,d,e . . . . These data are transferred to the buffer memory as they are obtained. On the other hand, their readout from memory 105 takes place at a higher rate, corresponding to a compression of the packet. In the example shown in FIG. 3, the readout rate of the data from memory 105 is three times that of the data read out from the speech coding circuit. In this example, the output of memory 150 supplies a signal having a redundancy of 2, the data being transmitted twice by memory 150, the first time on the end of a transmission burst, the second time on the beginning of the following transmission burst. In the example shown in FIG. 3, the transmission burst has a duration twice that of the interburst dead time. This is why a compression of data by three at the level of the buffer memory 105 is required. By way of example, the useful binary elements may fill memory 105 at the rate $V = 16K$ bits/second. This memory is emptied at three times this rate, i.e. 48K bits/second, into memory 150 which in this example may be simply a "first in-first out" memory. The useful duration of a burst may be equal to two milliseconds, the dead time separating two successive levels being equal to 1 millisecond. The readout order given by sequencer 108 is given twice in succession during the period of the burst, i.e. three milliseconds, the number of binary elements in a packet being the number of 16K bit binary elements corresponding to three milliseconds, i.e. 48 binary elements in a packet and 96 binary elements on each burst.

Figure 4:
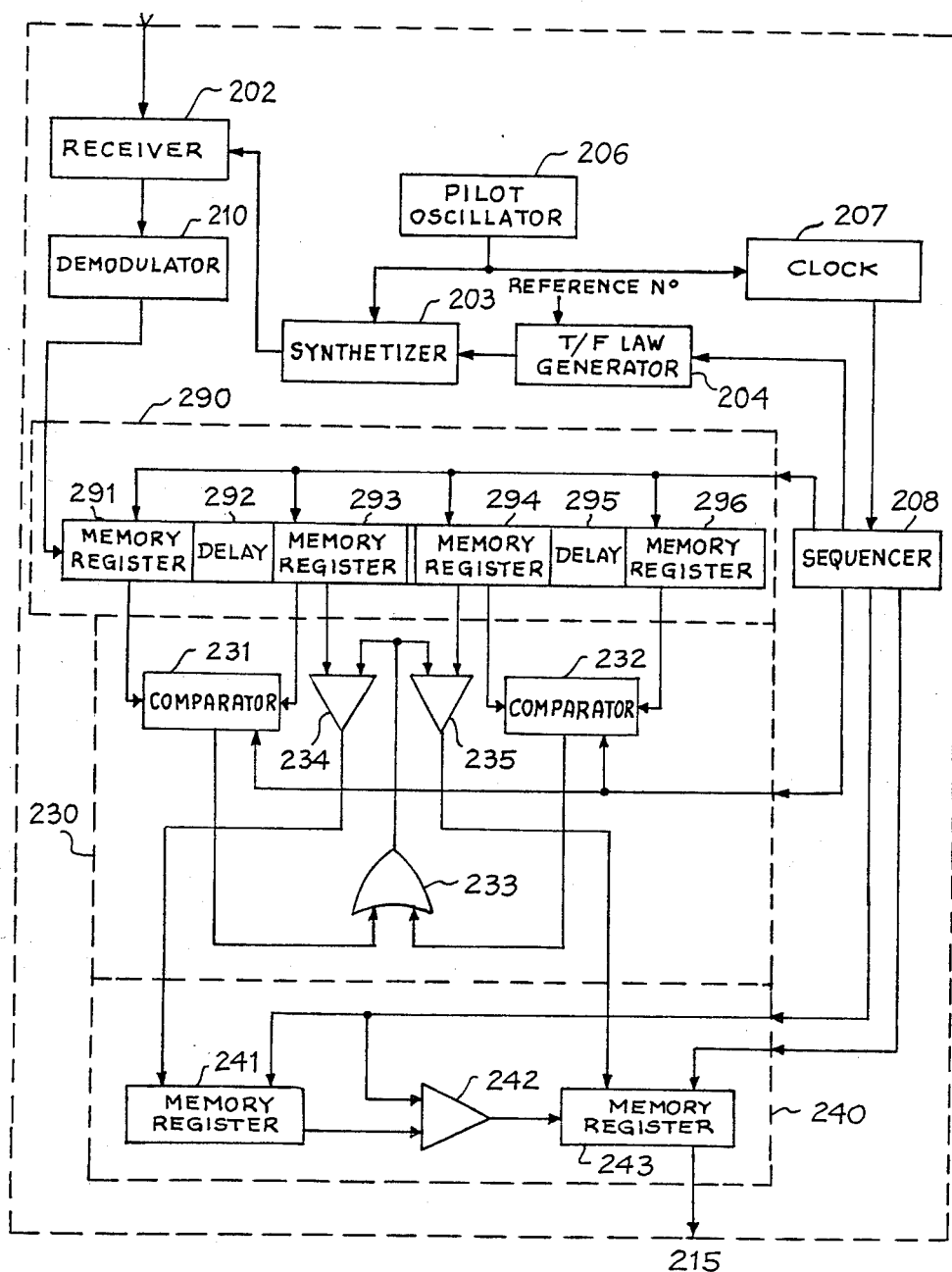
FIG. 4 shows one embodiment of the reception part of a station of the radiocommunications system for this first operating mode.

FIG. 4 shows the reception part of the corresponding station of the radiocommunications system of the invention. The references of the elements have been increased by 100 with respect to the similar elements in FIG. 1.

The receiver 202 receives the signal at the carrier frequency of the successive bursts modulated by the binary data elements. This receiver has an input for the carrier frequency from synthetizer 203 controlled by a time-frequency law generator 204 establishing the same law as the one established by the corresponding station in communication therewith. For that, the time-frequency law generator receives the same reference number associated with the mobile subscriber in communication and the control signal from the sequencer 208 ensuring operation in synchronism with the transmitting station. The circuits of known type providing this synchronism have not been shown. The synthetizer 203 is controlled as before by a pilot oscillator 206 also controlling a clock 207 whose output is connected to the input of the sequencer circuit 208. The output of receiver 202 is connected to the input of the demodulator 210 whose output is connected to the memory circuit 290. This memory circuit 290 comprises in series a first memory register having a capacity corresponding to half a burst, i.e. 48 memory slots, an intermediate register of the same capacity 292 corresponding to the dead time between two successive bursts, a second and a third memory register 293 and 294 of the same capacity, a second intermediate register 295 of the same capacity corresponding to the dead time between bursts and a fourth memory register 296 of the same capacity.

The data from the demodulator are transmitted to the input of the memory register 291 and shifted successively by transfer into the memory registers 291 to 296. When the last binary element of a packet transmitted for the second time is stored in register 291, register 293 comprises in the absence of disturbance the same packet of binary elements, and registers 294 and 296 comprise the binary elements corresponding to the preceding packet.

The outputs of the registers of the buffer memory 290 are connected to a validation circuit 230. The outputs of the memory registers 291 and 293 are connected to the inputs of a comparator 231; similarly the outputs of the memory registers 294 and 296 are connected to the inputs of a comparator 232. When the contents of registers 291 and 293 are similar or when the contents of registers 294 and 296 are similar, comparators 231 and 232 deliver respectively orders for validating the corresponding packets transmitted on the whole burst contained in registers 293 and 294. In fact, this coincidence means that the demodulator 210 has correctly intercepted the data corresponding to the link in progress and not the data transmitted on a burst of the same frequency emitted by another station of the system, external to the communication in progress, for the probability of intrinsic interference of two successive bursts by the same interfering station is very small. Conversely, if a packet of demodulated data intercepted on a frequency burst does not coincide with the corresponding packet of data at the end of the preceding burst or at the beginning of the next burst, one of the two bursts has been jammed and the intercepted data coming from an interfering station and not from the station in communication have been jammed. In this case, the validation order for the corresponding packet is not given by the corresponding comparator. However, the validation of one of the two packets of data of the burst contained in registers 293 and 294 causes that of the other half and it is the preceding or following burst which is not validated. Further, this interburst redundancy allows a disturbance in one burst of the sequence to be totally corrected if one of the preceding and following bursts has been received. For that, the validation outputs of comparators 231 and 232 are connected to the two inputs of an OR gate 233 whose output is connected to the first inputs of two transfer gates 234 and 235 receiving at their second inputs respectively the data at the output of the memory register 293 and the data at the output of memory register 294.

The outputs of the transfer gates 234 and 235 are connected to an output memory circuit 240 and more precisely to the inputs of memory registers 241 and 243. During validation of a burst, these memory registers 241 and 243 receive respectively the end of the burst and the beginning of this same burst, i.e. two successive packets of data. Each of these memory registers has a transfer control input connected to a corresponding output of the sequencer circuit 208. The data present in the memory register 243 following a validation are transferred to the output 215 of the reception circuit at the timing of the non compressed data, i.e. in the example described above at 16K bits/second. In a sequence of validated bursts, the data packets transferred to output 215 via memory register 243 correspond to all the beginnings of bursts.

When the beginning of the burst, that is to say the data corresponding to the first packet, have been transmitted and when the following burst has not been validated, the first packet of the following burst has not been transferred to the memory register 243 which is then empty. The sequencer then controls the transfer of the data present in memory register 241 to memory register 243. The data corresponding to the second packet of the preceding validated burst are then transferred in the same way to the output of the reception circuit at the timing of the non compressed data, i.e. at 16K bits/second. For this transfer, a transfer gate 242 has an input connected to the output of the memory register 241 and the other input connected to the corresponding output of the sequencer 208.

In the absence of validation, no data from the non validated burst is transmitted to the output 215 of the reception circuit.

For the correct operation of the device, it is indispensable for the order given by sequencer 208 for transferring the contents of register 241 to register 243 to coincide, except for a lag which is small compared with the duration of a binary element, with the comparison and transfer order given by sequencer 208 to comparators 231 and 232. This comparison and transfer order must itself follow, with a lag which is small compared with the binary duration, the input order of the last bit of the first half of a burst in the memory register 291. The memory registers used may be advantageously charge transfer circuits allowing, while taking into account the redundancy, the best decision to be made. During transfer of the contents of memory register 241 into memory register 243, register 241 is reset to a neutral value between 0 and 1, i.e; $\frac{1}{2}$, which allows the contents of this memory register not to be taken into account in the absence of validation on several successive bursts. Register 243 is intialized by the transfer of the contents of register 241. During guard transmission, the value $\frac{1}{2}$ may be transformed into a delta code alternation by an astatic stage provided at the output of memory 243 and controlled by the clock. If the contents of the memory, instead of being $\frac{1}{2}$, present a significant deviation from this value, it is the bit 1 or 0 corresponding to this deviation which is transmitted. In so far as the data transmission is concerned, the value $\frac{1}{2}$ may be transmitted for providing clearance, information acquired during the burst in a subsequent weighted decision taking into account the interburst redundancy.

Figure 5:
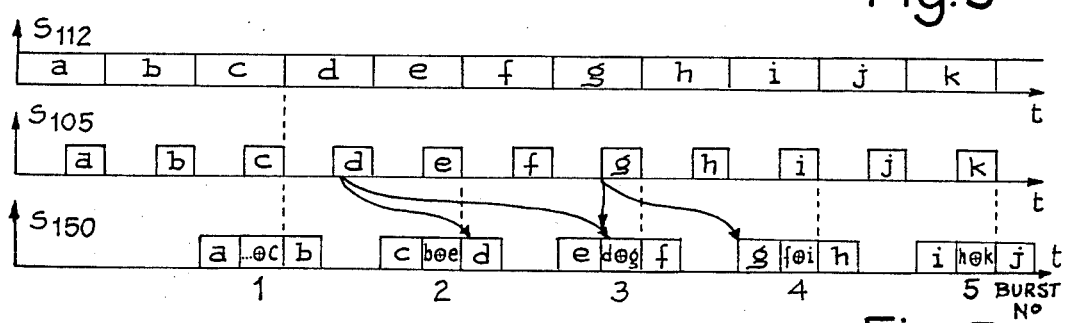
FIG. 5 is a signal diagram illustrating a second operating mode of the system of the invention

FIG. 5 shows a second data transmission mode with an interburst redundancy equal to 1.5 instead of 2 in the preceding example. To establish this example, the durations of the bursts have been chosen equal to those chosen in the preceding example, that is to say that the duration of the burst is twice that of the interburst dead time, two milliseconds and a millisecond respectively for example. In this example, the useful duration of a burst is divided into three, the data being then divided up between the initial and final parts of the bursts, the middle parts of the bursts being the modulo 2 bit by bit sum of the data of the final part of the preceding burst and of the initial part of the following burst. The data at the output of the speech coding circuit $S_{112}$ are grouped fictitiously into packets of 24 bits. These data are compressed when they leave memory 105 so that each packet of 24 bits may be transmitted during a third of the useful duration of a burst, i.e. two thirds of a millisecond. Thus, the data of packets a and b are transmitted at the beginning and at the end of burst No. 1, packets c and d are transmitted at the beginning and at the end of burst No. 2, data packets e and f are transmitted at the beginning and at the end of burst No. 3 etc . . . . In the middle parts of the bursts are transmitted, as indicated above, the modulo 2 bit by bit sums of the data of the final part of the preceding burst and of the initial part of the following burst, i.e. the data of packet b plus the data of packet e in the middle part of burst No. 2, the modulo 2 bit by bit sum of packets d and g in the middle part of burst No. 3 etc . . . .

During reception, the demodulated data are processed by a validation and transfer circuit.

For validating a packet of rank n, the sum of the last packet of the preceding level and of the first packet of the following burst is effected and compared with the data present in the second third of the packet to be validated.

If there is coincidence, the rank n burst is validated and the packets of data contained in the first and last thirds of the burst are transferred to the output circuit 240 which transmits them to the output 215 of the receiver at the timing of the non compressed data, i.e. at 16K bits/second.

If there is not coincidence, the rank n burst is not validated. It is then possible to reconstitute the information to be transmitted from the two preceding bursts or from the two following bursts, to the extent that these bursts have been validated.

The redundancy introduced in this example is less than that introduced in the first example described in detail above, so it is only possible to make the complete absence of a burst imperceptible if the two preceding bursts and the two following bursts have been correctly demodulated.

In both cases the flow of data to be transmitted keeps a value such that timing, path duration and multiple path problems may be resolved by conventional means similar to those used for radiocommunications on channels at ordinary but fixed frequencies for a communication.

The invention is not limited to what has been described above. In particular any type of redundant code having a self correction facility may be used provided that the redundancy is placed on a burst separate from those containing the information from which it has been calculated.

We claim:

1. A radiocommunications system for transmitting packets of digitized data between a fixed central station and a plurality of subscriber stations using a set of frequencies common to all said stations, each one of said plurality of subscriber stations being assigned at least one frequency law which is independent from frequency laws assigned to other subscriber stations, said fixed central station being assigned all of the frequency laws in said system, each one of said fixed central station and said subscriber stations comprising:

input means for receiving an input signal and for providing a succession of compressed packets of digitized data corresponding to said input signal;

processing means, connected to said input means, for calculating and inserting redundancy data into said succession of compressed packets of digitized data;

transmitter means, connected to said processing means and having a plurality of carrier frequencies, for transmitting said packets of digitized data and said redundancy data in a sequence of bursts variable in number, each burst corresponding to a brief transmission of one of said plurality of carrier frequencies modulated by said digitized data;

means, connected to said transmitter means, for varying by steps the transmitter carrier frequency at each said transmission according to the frequency law assigned to the subscriber station to which said transmission is directed, the frequency steps for all of said subscriber stations are synchronous and have the same duration; and reception means for receiving said transmitted packets of digitized data and for producing an output signal, including:

receiving means for receiving said transmitted packets of digitized data and said redundancy data;

demodulator means, connected to said receiving means, for demodulating the received packets of digitized data and said redundancy data;

memory means, connected to said demodulator means, for storing the demodulated data;

validation means, connected to said memory means, for validating said demodulated data, including comparator means for comparing said demodulated data with the associated redundancy data, whereby said demodulated data is validated when said redundancy data is that data which was inserted into the associated packet of digitized data; and output means, connected to and controlled by said validation means, for outputting a signal containing the validated, demodulated data.

2. A radiocommunications system according to claim 1 wherein each said burst is divided into a first half and a second half, and wherein said sequence of bursts includes a plurality of bursts separated by an interburst dead time, and wherein said transmitter means transmits a packet of said digitized data successively in the second half of a given burst and, after said interburst dead time, in the first half of a following burst, and wherein said comparator means validates the demodulated data of said given burst when at least one of the following occurs: (a) demodulated data in said first half of said given burst is the same as demodulated data in the second half of a preceding burst; and (b) the demodulated data in said second half of said given burst is the same as demodulated data in the first half of said following burst.

3. A radiocommunications system according to claim 2 wherein said memory means includes first, second, third and fourth register means, connected in series, for shifting successively in each register demodulated data corresponding to a half of a burst, and wherein said comparator means includes a first and a second comparator, said first comparator connected to said first and second register means and said second comparator connected to said third and fourth register means.

4. A radiocommunications system according to claim 1 wherein each said burst is divided into a first third, a middle third, and a last third, and wherein said succession of packets includes at least first and second packets, and wherein said transmitter means transmits said first packet in said first third of said burst, and transmits said second packet in said last third of said burst, and transmits in said middle third of said burst a modulo 2 bit by bit sum of the last third of a preceding burst and the first third of a following burst, and wherein said validating means validates a received burst when a middle third of said received burst is equal to a modulo 2 sum of a last third of a preceding received burst and a first third of a following received burst.

* * * * *